Dec. 6, 1927.
M. GUETT
1,652,118
RADIOCONDENSER
Filed July 1, 1925
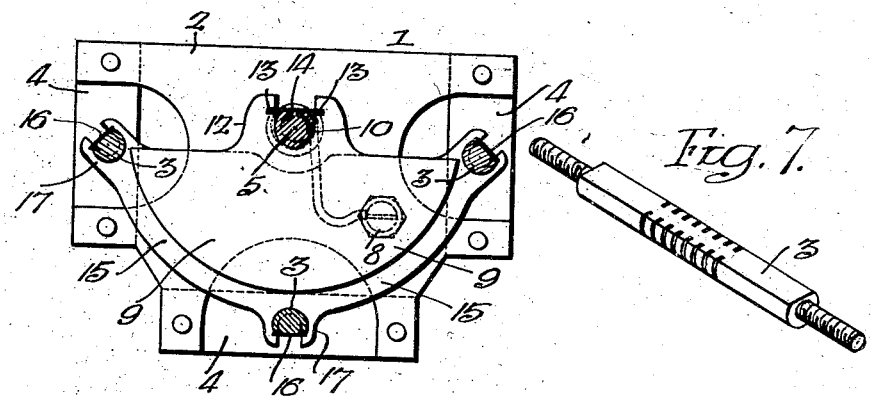
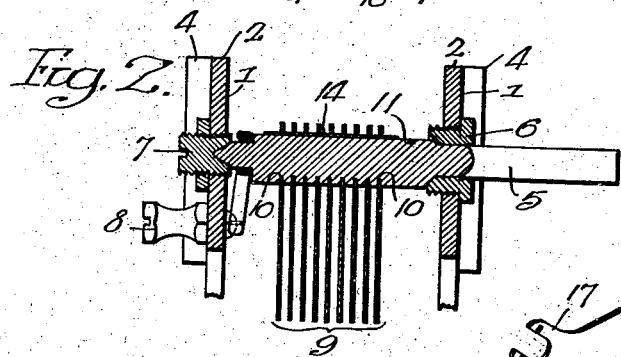
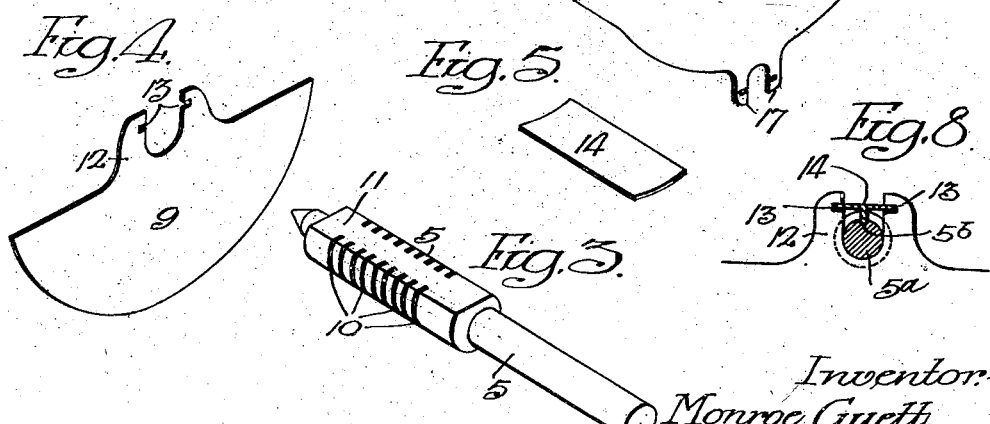
Inventor:-
Monroe Guett.
by his Attorneys.

Patented Dec. 6, 1927.

1,652,118

UNITED STATES PATENT OFFICE.

MONROE GUETT, OF HARTFORD, CONNECTICUT, ASSIGNOR TO HART & HEGEMAN MANUFACTURING COMPANY, OF HARTFORD, CONNECTICUT, A CORPORATION OF CONNECTICUT.

RADIOCONDENSER.

Application filed July 1, 1925. Serial No. 40,871.

One object of my invention is to construct a radio condenser so that the rotor plates and the stator plates can be placed accurately on their supports.

A further object of the invention is to provide means for firmly securing the plates to their supports.

In the accompanying drawings:

Fig. 1 is a transverse sectional view of a radio condenser, illustrating my invention;

Fig. 2 is a sectional view of a portion of the frame and the rotor, the stator plates being omitted;

Fig. 3 is a detached perspective view of the rotor shaft;

Fig. 4 is a detached perspective view of one of the rotor plates;

Fig. 5 is a detached perspective view of the key plate;

Fig. 6 is a perspective view of one of the stator plates;

Fig. 7 is a perspective view of one of the stator bolts; and

Fig. 8 is a view of a modification of the means for securing the plates to the shaft.

The frame 1 is of the ordinary construction and consists of two metallic plates 2, 2, which are spaced apart by stator bolts 3 that are secured to strips 4 of non-conducting material. In the present construction, there are three stator bolts. The rotor shaft 5 is mounted on a bearing 6, which is secured to one of the plates 2. The inner end of the shaft is conical and fits in a conical end bearing 7, which is adjustably secured to the other plate of the frame. The terminal 8 is flexibly connected to the shaft, as illustrated in Fig. 2, and a stop is provided to limit the rotation of the shaft.

In order to space the rotor plates 9 accurately on the shaft 5, a series of segmental grooves 10 are cut therein, which are spaced the required distance apart. One side of the shaft is flattened, as at 11.

The segmental rotor plates 9 are made as shown in Fig. 4. Each plate has a slotted extension 12, which forms the hub thereof. The slotted extension fits one of the grooves in the shaft and is notched at each side, as at 13. The notches are on a line with the flat surface of the shaft.

When the rotor plates are assembled on the shaft, a key plate 14, Fig. 5, is forced through the notches of the several plates, and secures them rigidly to the shaft. The key plate 14 is slightly curved transversely, as shown in Fig. 5, so that, when it is forced into position, it will draw the rotor plates to their seats on the shaft.

I preferably use the same construction in securing the stator plates 15 to their supporting bolts 3. The bolts are grooved in a manner similar to the shaft 5 and are flattened as shown in Figs. 1 and 7. The stator plates 15 are assembled on their bolts and are secured by the key plates 16, which enter the notches in the wall of the recess formed in the projection 17 of the plates. One of the bolts 3 forms the terminal for the stator plates.

The modification illustrated in Fig. 8 discloses a means for securing the plates to the shaft in a manner different from that illustrated in Fig 1. The shaft $5^a$ has a series of circumferential grooves cut therein and has a longitudinal keyway $5^b$. The plates $9^a$ fit the grooves, as shown, and a key plate $14^a$ enters the grooves in the plates and has a tongue $14^b$, which enters the keyway and prevents the plates turning on the shaft.

By the construction hereinbefore described, the rotor plates and the stator plates are accurately secured to their respective supports, and, as all of the grooves are cut simultaneously in the shaft and in the bolts, accuracy is assured and a number of loose washers is dispensed with.

I claim:

1. The combination in a radio condenser, of a shaft having a series of transverse grooves therein; a series of slotted plates located in the grooves, the walls of the slots in the plates being notched; and a key plate mounted on the shaft and extending into the notches of the plates, retaining the plates on the shaft.

2. The combination in a radio condenser, of a shaft having a series of segmental, transverse grooves therein and flattened on one side; a series of rotor plates having slotted extensions, the walls of the slots being notched; and a laterally curved key plate mounted on the flattened portion of the shaft and extending into the notches of the plates.

3. The combination in a radio condenser, of a shaft having a series of transverse grooves therein; a series of slotted plates located in the grooves, the walls of the slots being notched; and means, engaging the shaft and the notched plates, said means holding the plates from turning on the shaft.

MONROE GUETT.